(12) United States Patent
Petersen et al.

(10) Patent No.: US 6,316,796 B1
(45) Date of Patent: *Nov. 13, 2001

(54) SINGLE CRYSTAL SILICON SENSOR WITH HIGH ASPECT RATIO AND CURVILINEAR STRUCTURES

(75) Inventors: Kurt E. Petersen, San Jose; Nadim Maluf, Mountain View; Wendell McCulley, San Jose; John Logan, Danville; Erno Klaasen, Sunnyvale; Jan Mark Noworolski, Berkeley, all of CA (US)

(73) Assignee: Lucas NovaSensor, Fremont, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/652,867

(22) Filed: May 23, 1996

Related U.S. Application Data

(63) Continuation-in-part of application No. 08/449,140, filed on May 24, 1995, now Pat. No. 6,084,257.

(51) Int. Cl.$^7$ .............................. H01L 27/20; H01L 29/84

(52) U.S. Cl. ...................... 257/254; 257/417; 257/418; 257/623; 257/628; 73/718; 73/724; 73/514.21; 73/514.29; 73/514.36; 73/DIG. 1; 438/50; 438/52; 200/329

(58) Field of Search ...................................... 257/419, 414, 257/415, 417, 254, 623, 628, 627, 622, 418; 73/DIG. 1, 514.21, 514.36, 514.29, 718, 724; 437/901, 228; 216/39, 8, 17; 200/329; 438/50; 11/52

(56) References Cited

U.S. PATENT DOCUMENTS

| | | | |
|---|---|---|---|
| 4,663,648 | * 5/1987 | Bean | 357/55 |
| 4,730,496 | 3/1988 | Knecht et al. | 73/724 |
| 5,060,526 | 10/1991 | Barth et al. | 73/862.59 |
| 5,065,978 | 11/1991 | Albarda et al. | 251/129.06 |
| 5,132,658 | 7/1992 | Dauenhauer et al. | 338/92 |
| 5,142,781 | 9/1992 | Mettner et al. | 29/890.124 |
| 5,179,499 | 1/1993 | MacDonald et al. | 361/313 |
| 5,198,390 | 3/1993 | MacDonald et al. | 437/203 |
| 5,235,187 | 8/1993 | Arney et al. | 250/306 |

(List continued on next page.)

FOREIGN PATENT DOCUMENTS

| | | |
|---|---|---|
| 41 01 575 A1 | 7/1992 | (DE) . |
| 44 17 251 A1 | 11/1995 | (DE) . |
| 44 22 942 A1 | 4/1996 | (DE) . |

(List continued on next page.)

OTHER PUBLICATIONS

V.A. Yunkin et al., "Highly Anisotropic Selective Reactive Ion Etching of Deep Trenches in Silicon," *Elsevier Science B.V.*, Microelectronic Engineering, vol. 23 (1994) pp. 373–376.

(List continued on next page.)

*Primary Examiner*—William Mintel
(74) *Attorney, Agent, or Firm*—Morrison & Foerster LLP

(57) ABSTRACT

In one aspect, the invention provides a semiconductor sensor which includes a first single crystal silicon wafer layer. A single crystal silicon structure is formed in the first wafer layer. The structure includes two oppositely disposed substantially vertical major surfaces and two oppositely disposed generally horizontal minor surfaces. The aspect ratio of major surface to minor surface is at least 5:1. A carrier which includes a recessed region is secured to the first wafer layer such that said structure is suspended opposite the recessed region.

54 Claims, 13 Drawing Sheets

U.S. PATENT DOCUMENTS

| | | | |
|---|---|---|---|
| 5,238,223 | 8/1993 | Mehner et al. | 251/368 |
| 5,285,097 * | 2/1994 | Hirai | 257/417 |
| 5,287,082 | 2/1994 | Arney et al. | 338/307 |
| 5,316,979 | 5/1994 | MacDonald et al. | 437/203 |
| 5,363,021 | 11/1994 | MacDonald | 315/366 |
| 5,375,033 | 12/1994 | MacDonald | 361/281 |
| 5,386,142 | 1/1995 | Kurtz et al. | 257/690 |
| 5,393,375 | 2/1995 | MacDonald | 156/643 |
| 5,393,711 | 2/1995 | Biallas et al. | 437/231 |
| 5,397,904 | 3/1995 | Arney et al. | 257/66 |
| 5,399,415 | 3/1995 | Chen et al. | 428/209 |
| 5,400,824 | 3/1995 | Gschwender et al. | 137/625.28 |
| 5,426,070 | 6/1995 | Shaw et al. | 437/203 |
| 5,506,175 | 4/1996 | Zhang et al. | 437/228 |
| 5,536,988 | 7/1996 | Zhang et al. | 310/309 |
| 5,563,343 | 10/1996 | Shaw et al. | 73/514.18 |
| 5,565,625 | 10/1996 | Howe et al. | 73/514.16 |
| 5,567,880 | 10/1996 | Yokota et al. | 73/514.33 |
| 5,587,601 | 12/1996 | Kurtz | 257/417 |
| 5,591,679 | 1/1997 | Jakobsen et al. | 437/228 |
| 5,594,171 | 1/1997 | Ischida et al. | 73/514.32 |
| 5,615,143 | 3/1997 | MacDonald et al. | 365/112 |
| 5,627,427 | 5/1997 | Das et al. | 313/308 |
| 5,628,917 | 5/1997 | MacDonald et al. | 216/2 |
| 5,637,539 | 6/1997 | Hofmann et al. | 438/20 |

FOREIGN PATENT DOCUMENTS

| | | |
|---|---|---|
| 0 368 446 | 5/1990 | (EP) . |
| 0 558 371 | 3/1994 | (EP) . |
| 0 591 554 | 4/1994 | (EP) . |
| 0 605 300 | 7/1994 | (EP) . |
| 5451490 | 4/1979 | (JP) ... 257/420 |
| 362190775 * | 8/1987 | (JP) ... 257/419 |
| 94/18697 | 8/1994 | (WO) . |
| WO 94/28427 | 12/1994 | (WO) . |
| WO 96/08036 | 3/1996 | (WO) . |
| 97/01221 | 1/1997 | (WO) . |
| 97/04283 | 2/1997 | (WO) . |
| WO 99/16096 | 4/1999 | (WO) . |

OTHER PUBLICATIONS

"Monolithic Accelerometer With Signal Conditioning," Analog Devices ADXL50 datasheet specifications believed to be dated 1993.

Y. Uenishi et al., "Micro–Opto–Mechanical Devices Fabricated By Anisotropic Etching of (110) Silicon," *Proceedings of the IEEE*, Micro Electro Mechanical Systems, 1994, pp. 319–324.

Seidel, H. et al. (1990) "Antistrophic Etching of Crystalline Silicon in Alkaline Solutions, Orientation Dependence and Behavior of Passivation Layers," *J. Electrochem. Soc.* 137(11):3612–3632.

Elie S. Anmar, et al. (1980). "UMOS Transistors on (110) Silicon," *IEEE Transactions on Electron Devices* (ED–27)(5):907–914.

Noworolski et al. (1996) "Process for in–plane and out–of–plane single–crystal–silicon thermal microactuators," *Sensors and Actuators* 55(1):65–69.

K. Petersen, "Silicon as a Mechanical Material," *Proceedings of the IEEE*, vol. 70, No. 5, May 1982, pp. 420–457.

A. Goyal et al., "Formation of Silicon Reentrant Cavity Heat Sinks Using Anisotropic Etching and Direct Wafer Bonding," *IEEE Electron Device Letters*, vol. 14, No. 1, Jan. 1993, pp. 29–32.

K. Suzuki, "Single Crystal Silicon Micro–Actuators," *IEEE Electronic Devices Technical Digest*, International Electron Devices Meeting, 1990, pp. 625–628.

K. Petersen et al., "Surface Micromachined Structures Fabricated with Silicon Fusion Bonding," *IEEE*, 1991, pp. 397–399.

J. Bartha et al., "Low Temperature Etching of Si in High Density Plasma Using $SF_6/O_2$," *Elsevier Science B.V.*, MicroElectronic Engineering, vol. 27, 1995, pp. 453–456.

C. Fung et al., "Deep Etching of Silicon Using Plasma", Micromachining and Micropackaging of Transducers, *Elsevier Science Publishers B.V.*, 1985, pp. 159–164.

C. Linder et al., "Deep Dry Etching Techniques as a New IC Compatible Tool For Silicon Micromachining," *IEEE*, 1991, pp. 524–527.

V.A. Yunkin et al., "Highly Anisotropic Selective Reactive Ion Etching of Deep Trenches in Silicon," *Elsevier Science B.V.*, Microelectronic Engineering, vol. 23 (1994) pp. 373–376.

J. Bryzek et al., "Micromachines on the March," *IEEE Spectrum*, May 1994, pp. 20–31.

Ammar, Elie S. and Rodgers, T.J., "UMOS Transistors on (110) Silicon", *IEEE Transactions on Electron Devices*, vol. Ed–27, No. 5 (1980).

Goodenough, Frank, "Redesigned Surface–Micromachined Accelerometer IC Provides Increased Sensitivity of ±1–5 G Full Scale", *Electronic Design, Technology Advances* (1995) pp. 37, 40.

Sherman, S.J. et al., "A Low Cost Monolithic Accelerometer; Product/Technology Update", *IEEE Technical Digest*, (1992) pp. 501–504.

PCT Written Opinion dated Feb. 20, 1997 which relates to International Application No. PCT/US96/07605 which corresponds to U.S. Application Serial No. 08/449,140.

International Search Report for PCT/US 99/19971.

* cited by examiner

Pattern frontside with cavity mask and backside with alignment markers.

Timed anisotropic or plasma etch to form cavities.
Strip frontside insulator.

Silicon fusion band epi wafer to frontside. Epi thickness determines MEMS device thickness.

ECE etch to epi interface.

Deposit insulator on frontside and process sensing on chip circuits.

Define MEMS structure in insulator layer.

Anisotropic plasma etch to form MEMS structure.

SINGLE CRYSTAL SILICON SENSOR WITH HIGH ASPECT RATIO AND CURVILINEAR STRUCTURES

RELATED APPLICATIONS

This application is a continuation-in-part of patent application Ser. No. 08/449,140, filed May 24, 1995, by inventors Kurt Petersen; Nadim Maluf; Wendell McCulley; John Logan and Erno Klaassen, entitled, "Single Crystal Silicon Sensor With High Aspect Ratio and Curvilinear Structures and Associated Method" now U.S Pat. No. 6,084,257".

This invention was made with Government support under Contract No. DAAL01-94-C-3411.

BACKGROUND OF THE INVENTION

1. Field of the Invention

The invention relates, in general, to semiconductor microelectronic sensors, and more particularly, to single crystal silicon sensors that include structures with diverse contours and high aspect ratio geometries.

2. Description of the Related Art

The electrical and mechanical properties of silicon microsensors have been well chronicled. For example, refer to Kurt E. Petersen, "Silicon as a Mechanical Material", Proceedings of the IEEE, vol. 70, No. 5, May 1982. Moreover, there is a large and growing body of knowledge concerning techniques for constructing silicon microstructures, commonly referred to as "micromachining". See, for example, Bryzek, Petersen and McCulley, "Micromachines on the March", IEEE Spectrum, May 1994, pp.20–31.

Silicon micromachining has blossomed into a vital industry with numerous practical applications. For instance, micromachined silicon pressure and acceleration sensors have found their way into medical instrumentation and automobiles. The high strength, elasticity and resilience of silicon makes it an ideal base material for resonant structures that may, for example, be useful for electronic frequency control. Even consumer items such as watches, scuba diving equipment, hand-held tire pressure gages and inflatable tennis shoes may soon incorporate silicon micromachined sensors.

The demand for silicon sensors in ever expanding fields of use continues to fuel a need for new and different silicon microsensor geometries optimized for particular environments. Unfortunately, a drawback of traditional bulk silicon micromachining techniques has been that the contours and geometries of the resulting silicon microstructures have been significantly limited by these fabrication methods. For example, anisotropic etching of single crystal silicon (SCS) can achieve an anisotrophy rate of 100:1 in the <100> crystallographic direction relative to the <111> direction. The result of such anisotropic etching of SCS, however, typically will be a silicon microstructure with sidewalls that are inclined because of the intersection of the (100) and (111) crystallographic planes. As a result, the contours of silicon microstructures have been limited by the orientation of the internal crystallographic planes. Thus, there has been a need for silicon microsensors having structures with more diverse geometric contours.

The increasing use of microsensors to measure pressure and acceleration has spurred the development of tiny silicon plate structures used as capacitors and to produce electrostatic forces, for example. For instance, there exist microsensors that measure capacitance using an array of interdigitated polysilicon plates. Similarly, there exist microsensors that produce electrostatic forces using an array of interdigited plates. Ordinarily, the surface areas of such plates are relatively small since they typically are formed in a deposited polysilicon layer. Increasing the surface area of such capacitive plates increases their capacitance. Increasing the surface area of such electrostatic drive plates increases their drive capability. Hence, there has been a need for capacitive plates and electrostatic drive plates with increased surface areas.

There also is a need for improved silicon microstructures on which electronic circuitry can be formed. For example, metal oxide semiconductor (MOS) circuits generally are most effective when formed in (100) silicon wafers. Unfortunately, traditional silicon micromachining techniques usually favor the formation of microsensors in (110) wafers. Hence, MOS circuits have not been prevalent in silicon microsensors. Moreover, in some applications there can be a need to thermally isolate a circuit formed as part of a microsensor in order to ensure optimal circuit performance.

A problem with tuneable resonant microstructures formed from materials such as polysilicon or metal is that they can suffer frequency drift over time due to internal crystal stresses that develop from usage. Thus, there is a particular need for a microstructure that employs a high-Q resonator that does not suffer from crystal stresses. It has long been known that SCS is an excellent base material for a resonant structure. It is strong, flexible and highly elastic, and its single crystal structure makes it more resistant to performance degradation. However, tuning the resonant frequency of an SCS resonant structure can be a challenge. Consequently, there is a need for an improved approach to the tuning of a high-Q SCS resonator.

Thus, there has been a need for silicon microsensors that incorporate structures with more diverse geometries including structures with contours that are not limited by the crystallographic planes of silicon and plates with increased surface areas. There also has been a need for silicon microsensors with structures that are better suited to the formation of electronic circuitry. In addition, there has been a need for silicon microstructures with improved resonant structures. The present invention meets these needs.

SUMMARY OF THE INVENTION

In one aspect, the invention provides semiconductor sensor which includes a first single crystal silicon wafer layer. A single crystal silicon structure is formed in the first wafer layer. The structure includes two oppositely disposed substantially vertical major surfaces and two oppositely disposed generally horizontal minor surfaces. The aspect ratio of major surface to minor surface is at least 5:1. A carrier which includes a recessed region is secured to the first wafer layer such that said structure is suspended opposite the recessed region.

DETAILED DESCRIPTION OF THE PREFERRED EMBODIMENTS

The present invention comprises a single crystal silicon sensor with curvilinear structures and high aspect ratio structures and an associated method of manufacture. The following description is presented to enable any person skilled in the art to make and use the invention. Descriptions of specific applications are provided only as examples. Various modifications to the preferred embodiment will be readily apparent to those skilled in the art, and the general principles defined herein may be applied to other embodiments and applications without departing from the spirit and scope of the invention. Thus, the present invention is not intended to be limited to the embodiments shown, but is to be accorded the widest scope consistent with the principles and features disclosed herein.

Figure 1:
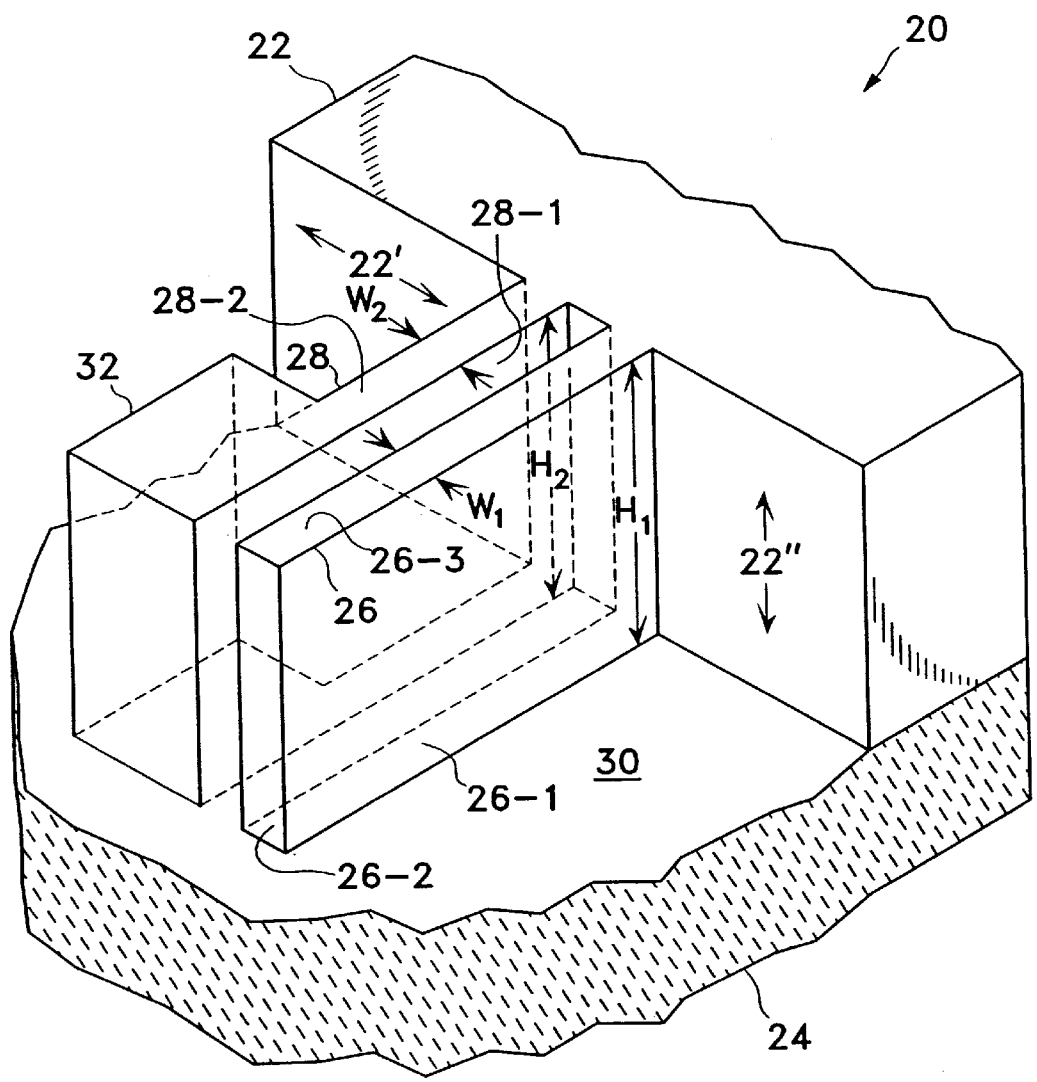
FIG. 1 is a perspective fragmented view of a portion of a silicon sensor in accordance with an embodiment of the invention.

Referring to the illustrative drawings of FIG. 1, there is shown a partial, fragmented, perspective view of a portion of a silicon microsensor 20 in accordance with a presently preferred embodiment of the invention. The microsensor 20 includes a first single crystal silicon (SCS) wafer layer 22 bonded to a carrier 24. First and second beams 26 and 28 depend from the first layer 22. The phantom lines in FIG. 1 represent surfaces that are hidden from view. The two beams 26 and 28 are suspended over a recessed region 30 of the carrier 24, such that the beams can move relative to the carrier 24.

Beam 26 includes a pair of oppositely facing major vertical surfaces 26-1 and a minor vertical distal end surface 26-2 and further includes a pair of opposite facing horizontal surfaces 26-3. Similarly, beam 28 includes a pair of oppositely facing major vertical surfaces 28-1 and a pair of oppositely facing horizontal surfaces 28-2. It will be appreciated that only one of each of the major vertical surfaces in 28-1 and only one of the horizontal surfaces 28-2 are visible in the drawing. In addition, the second beam 28 has a seismic mass 32 secured to a distal end thereof.

In operation, each of the two beams deflect in the plane of the first layer 22 as indicated by arrows 22' but cannot deflect in a direction generally perpendicular to the plane of the first layer 22 as indicated by arrows 22". This ability to flex in the plane of the first layer 22 but not out of the plane of the first layer 22 results from the aspect ratio of the beams; the ratio of their vertical heights $H_1$ and $H_2$ respectively to their widths, $W_1$ and $W_2$, respectively.

Figure 2:
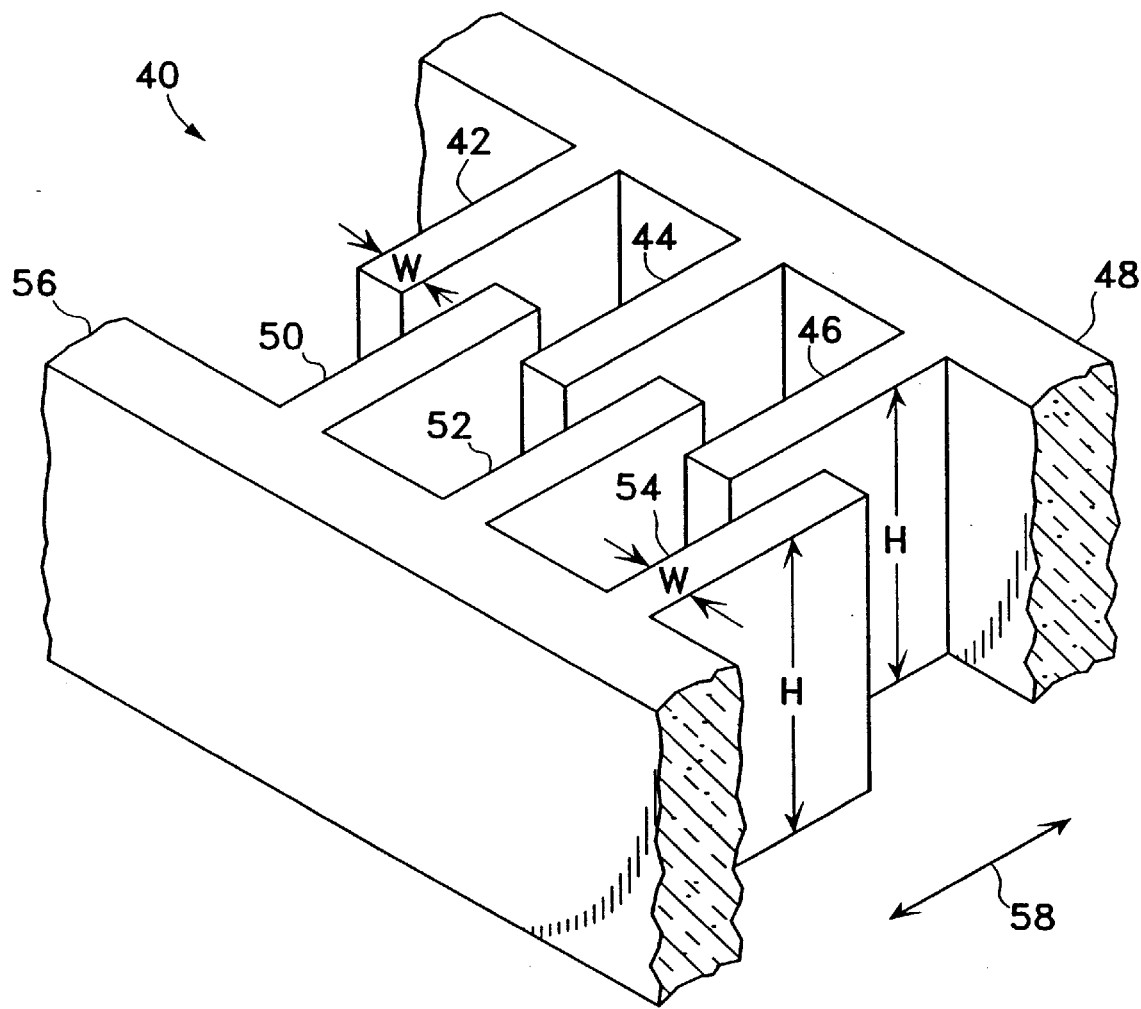
FIG. 2 is a perspective view of an array of high aspect ratio interdigitated vertical plates used either for capacitance pick-up or electrostatic force in accordance with an embodiment of the invention.

Referring to the illustrative drawings of FIG. 2, there is shown an array of interdigitated plate structures in accordance with an embodiment of the invention. Fixed plate structures 42, 44 and 46 are integrally secured to a fixed semiconductor structure 48. Single crystal semiconductor plate structures 50, 52 and 54 all depend from a moveable silicon structure 56. The direction of movement of the moveable plate structures 50, 52 and 54 relative to the fixed plate structures 42, 44 and 46 is indicated by the arrow 58.

Each of the fixed plates and the moveable plates can be doped to make them conductive. In one embodiment, the dopant is boron and the dopant concentration is between $10^{16}/cm^3$ to $10^{20}/cm^3$. Alternatively, phosphorus or arsenic can be used as the dopant, for example. The structure illustrated in FIG. 2 can operate as a series of parallel capacitors. The amount of total capacitance depends upon the degree of overlap of the interdigitated fixed plates 42, 40 and 46 with the moveable plates 50, 52 and 54. The movement of the moveable plates along the axis indicated by arrow 58 determines the amount of overlap. Alternatively, the structure in FIG. 2 also can serve as an electrostatic drive mechanism. In that case, a voltage differential between the fixed plates 42, 44 and 46 and the moveable plates 50, 52 and 54 can exert an electrostatic force which can induce the moveable plates to alter the amount of overlap with the fixed plates.

It will be appreciated that the surface areas of the interdigitated plates can have an important bearing up on the capacitance between plates of the interdigitated structure in FIG. 2. Likewise, the amount of overlapping surface area can also have an important bearing on the amount of electrostatic force that can be exerted by a structure like that in FIG. 2.

Thus, to the extent that the current invention permits the production of plate devices that have relatively high aspect ratios (plate height/plate width), the invention facilitates the production of more efficient interdigitated plate capacitor arrays and interdigitated plate electrostatic drive arrays.

Figure 3:
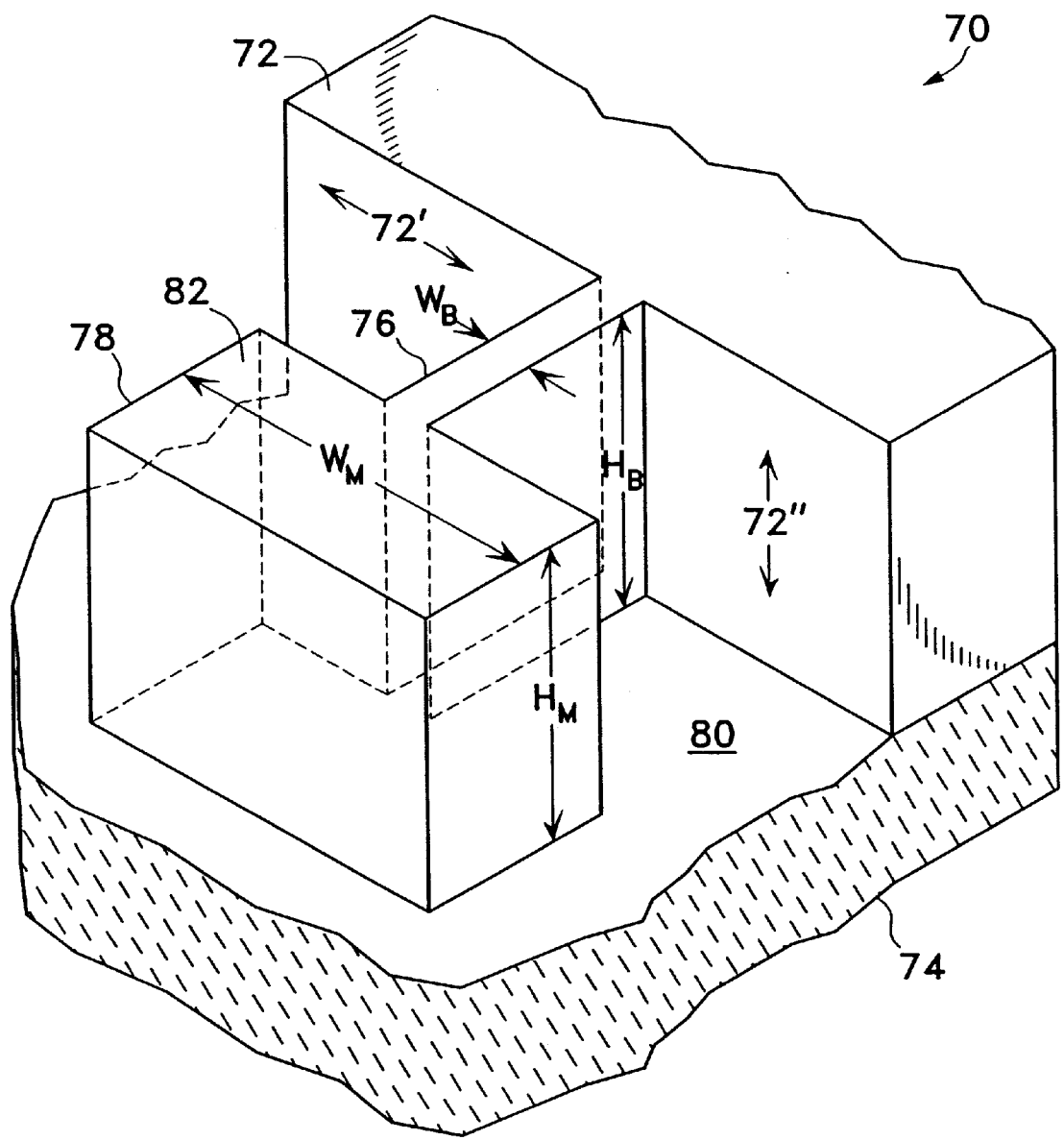
FIG. 3 is a perspective fragmented view of a portion of a silicon sensor in accordance with an embodiment of the invention.

Referring to the illustrative drawings of FIG. 3, there is shown a perspective fragmented view of a portion of a SCS silicon microsensor 70 in accordance with the embodiment of the present invention. The microsensor 70 includes a first SCS layer 72 bonded to carrier 74. A beam 76 having a seismic mass 78 formed on a distal end thereof depends from the first layer and is suspended over a recessed region 80 of the carrier 74 such that the beam 76 and its mass 78 can move relative to the carrier 74.

The aspect ratio (vertical height/horizontal width) of the beam is large enough such that it can deflect in the plane of the first layer 72 indicated by arrow 72' but cannot deflect out of the plane of the layer 72 indicated by arrow 72". The processing techniques, described below, permit the fabrication of a beam with an aspect ratio of at least 20:1.

Moreover, since the processing techniques described below permit deep etching independent of crystallographic directions, the beam 76 and the seismic mass 78 can be formed in (100) silicon wafers which are suitable for fabrication of MOS circuits. Hence, a MOS circuit can be readily formed in the upper face 82 of the seismic mass using standard semiconductor processing techniques.

Figure 4:
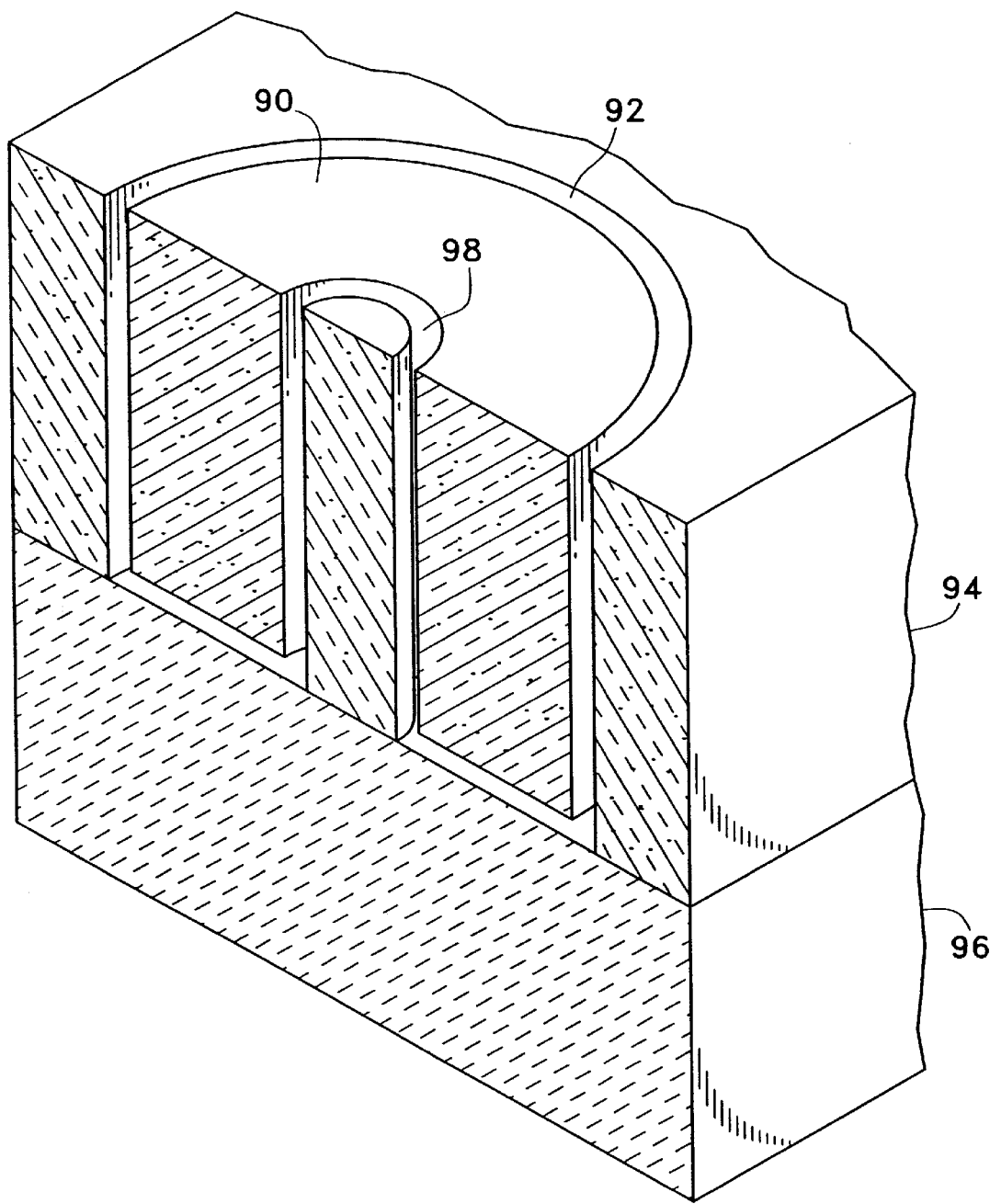
FIG. 4 is a cross-sectional perspective view of a curvilinear released structure in accordance with an embodiment of the invention.

Referring to the illustrative drawings of FIG. 4, there is shown a cross-sectional view of a fully released SCS structure 90 still seated within a recess 92 which has been etched into a first SCS wafer layer 94, which is bonded to a carrier 96 in accordance with invention. In particular, the released structure 90, which is shown in cross-section, is cylindrical in shape. It has a curvilinear outer circular (circumference) defined by the etched away region 92. In addition, it has a circular (curvilinear) inner core defined by etched away region 98. The inner core of the released structure surrounds an upstanding portion of the carrier 96 which, for example, can serve as a stabilizing member or an axel.

Thus, it will be appreciated that the fabrication techniques described below can be used to create etch patterns which are curvilinear in shape. The term curvilinear as used herein shall mean bending without angles. A curvilinear structure is one which has portions thereof which bend without precise angles, although other portions may comprise straight segments or angled joints. Examples of curvilinear structures include circles, ellipses and spirals.

Figure 5:
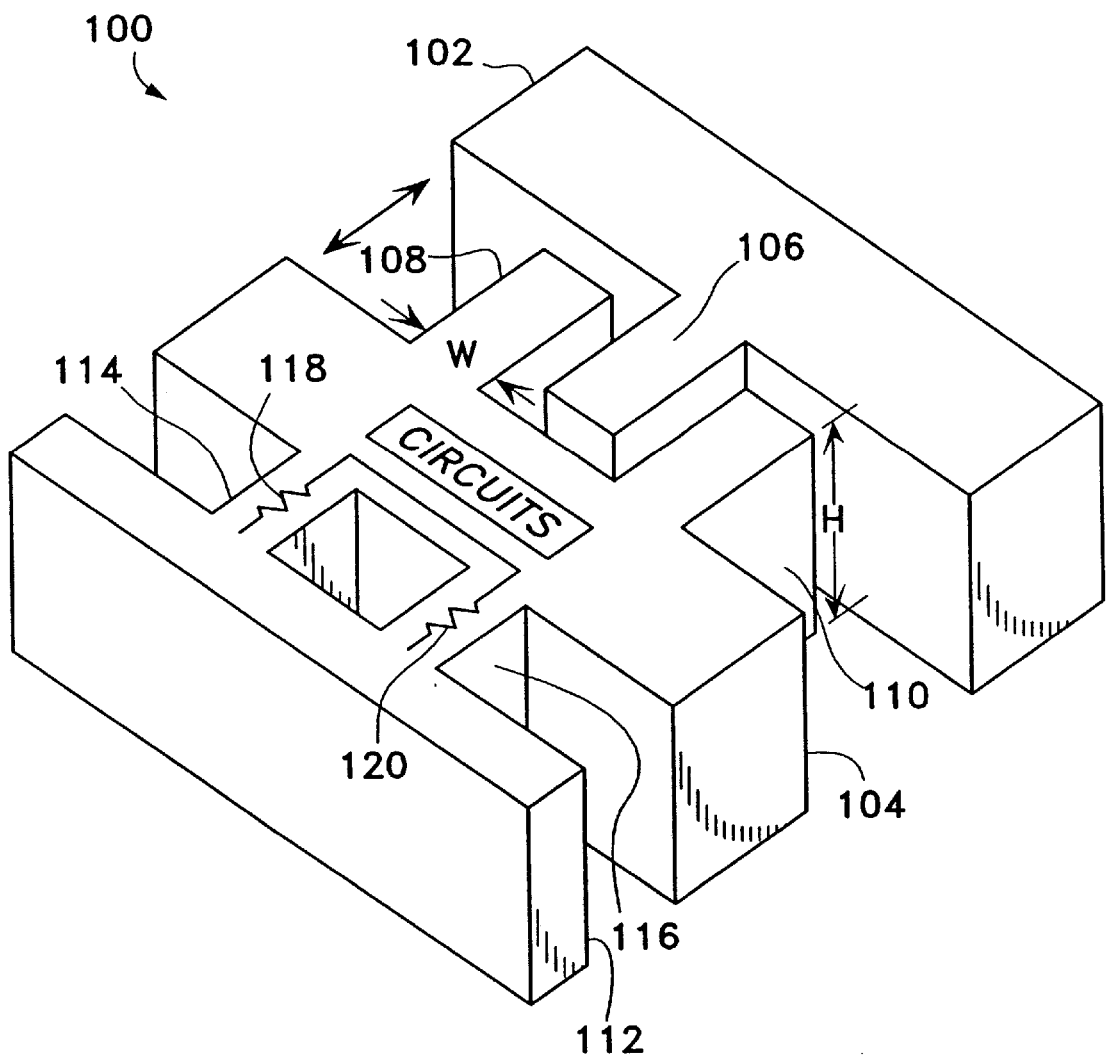
FIG. 5 is a perspective view of a portion of suspended structures and a portion of a fixed structures used as a variable capacitor in accordance with an embodiment of the invention.

Referring to the illustrative drawings of FIG. 5, there is shown a perspective partial view of a variable capacitor 100 in accordance with an embodiment of the invention. The variable capacitor comprises a fixed structure 102 and a moveable structure 104. The fixed structure includes a capacitor plate 106 which is interdigitated with parallel plates 108 and 110 which depend from the moveable structure 104. It will be appreciated that the moveable structure 104 depends from a fixed SCS wafer layer 112 and that the entire moveable structure is suspended over a carrier (not shown). Moreover, it will be appreciated that the capacitor may have additional plates which are not shown. The processes for producing the moveable structure will be appreciated from the discussion below.

The moveable structure 104 also includes thermal actuators 114 and 116. The thermal actuators contain circuitry 118 and 120 which, when electric current is passed through them causes the thermal actuators to heat up resulting in expansion of the SCS beams in which they are disposed. The heating of the beams and their expansion causes a movement of the capacitive plate 108 and 110 toward the fixed structure 102. As a result, there is greater overlap of the plates 108 and 106 and of the plates 106 and 110. The increased overlap results in an increased capacitance. Since the current invention permits the fabrication of structures such as those shown in FIG. 5 using (100) silicon, complex MOS used to monitor capacitance between the plates 108 and to control the flow of current in the thermal actuators can be disposed directly on the moveable structure. Furthermore, since the processing techniques described below permit the production of plates with relatively high aspect ratios (height/width) a large number of capacitive plates can be squeezed in close to each other, and the increased height afforded by the deep etching process ensures that greater surface area will be exposed when the plates are fully engaged.

Figure 6:
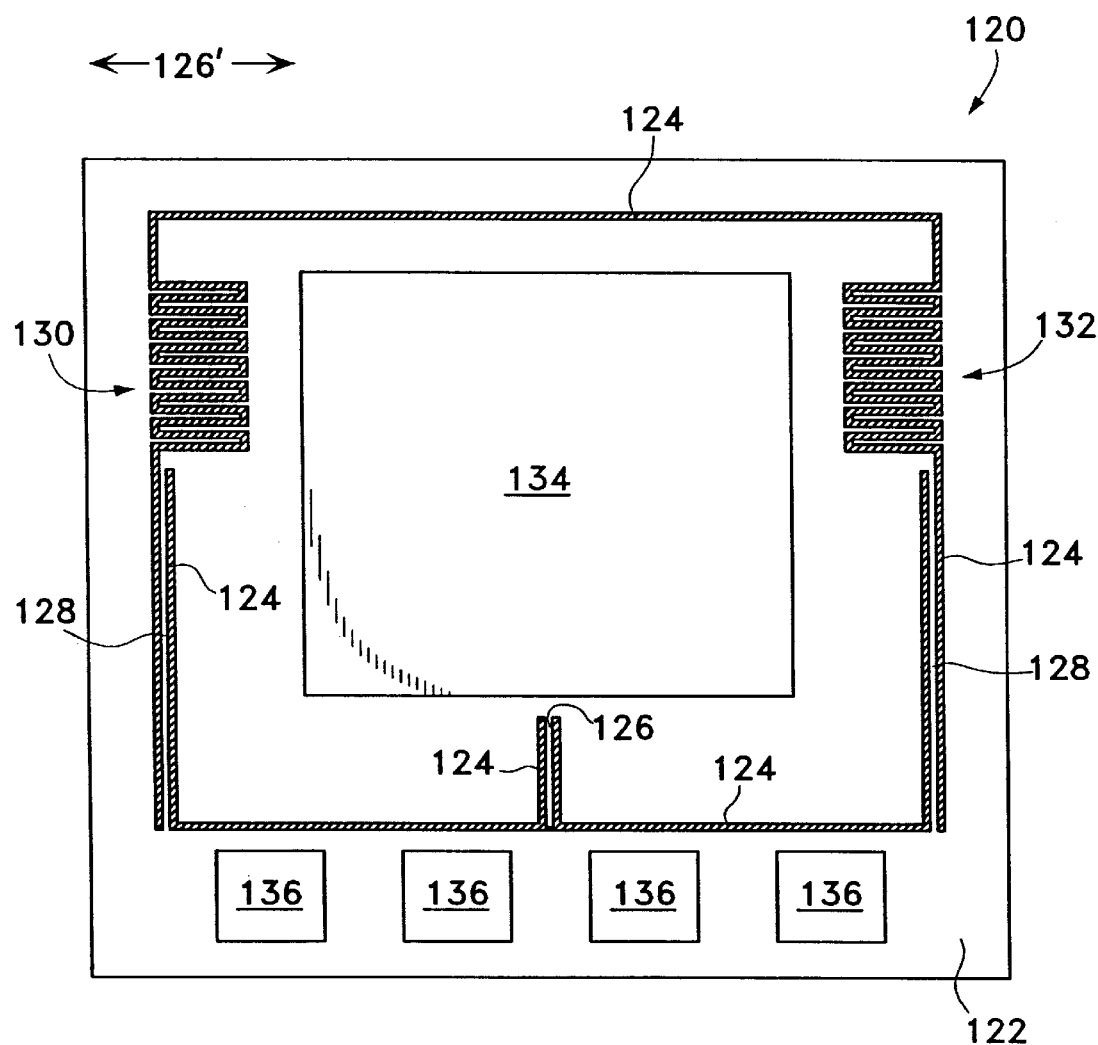
FIG. 6 is a top elevation view of an acceleration sensor in accordance with an embodiment of the invention.

Referring to the illustrative drawings of FIG. 6, there is shown a top elevation view of a SCS accelerometer in accordance with a current embodiment in the invention. A first SCS wafer layer 122 has deep grooves 124 formed therein to define a suspended beam 126 elongated mechanical guidance beams 128 and a plurality of interdigitated electrostatic plates 130 and 132. The released structure includes a proof mass 134. Piezoresistors (not shown) are disposed at the foot of the beam 126 at the point of highest stress. Interconnect pads 136 are used to make of-chip electrical connections to the accelerometer 120.

It will be appreciated that the suspended structures are suspended over a carrier (not shown) and can move freely relative to the carrier. The sense-beam 126 and the interdigitated plates 130 and 132 can have relatively large aspect ratios (height/width). This relatively high aspect ratio can prevent the beam from twisting due to off-axis acceleration. As explained above, a high aspect ratio beam can move readily within the plane of the first wafer 122 but cannot move out of that plane. Moreover, the relatively high aspect ratio of the interdigitated plates permits increased capacitive coupling and also allows for increased electrostatic force. The elongated beams 128 serve as stabilizers. They flex much more readily than the short sense-beam 126. Hence, they are not used for actual measurements of stress and therefore acceleration. However they are used to stabilize the movement of the relatively large collection of suspended structures.

In operation, the short sense-beam will flex in a direction indicated by arrow 126'. The collection of interdigitated plates 130 and 132 will either experience an increase in overlap capacity or a decrease in overlap capacity depending upon the direction of deflection of the sense-beam 126. Thus, the capacitive plates can be used to sense a degree of deflection of the sense-beam. Alternatively, the interdigitated beams can be used to apply an electrostatic force sufficient to overcome the deflection of the beam. The degree of electrostatic force necessary to overcome such deflection is related to the acceleration experienced by the accelerometer 120. The circuitry used to determine the amount of flexure of the sense-beam, and the amount of overlap of the interdigitated plates 130 and 132 or, alternatively, to apply a countervailing electrostatic force, employ techniques well known to those skilled in the art and that are not part of the present invention. Hence they need not be described herein.

Figure 7:
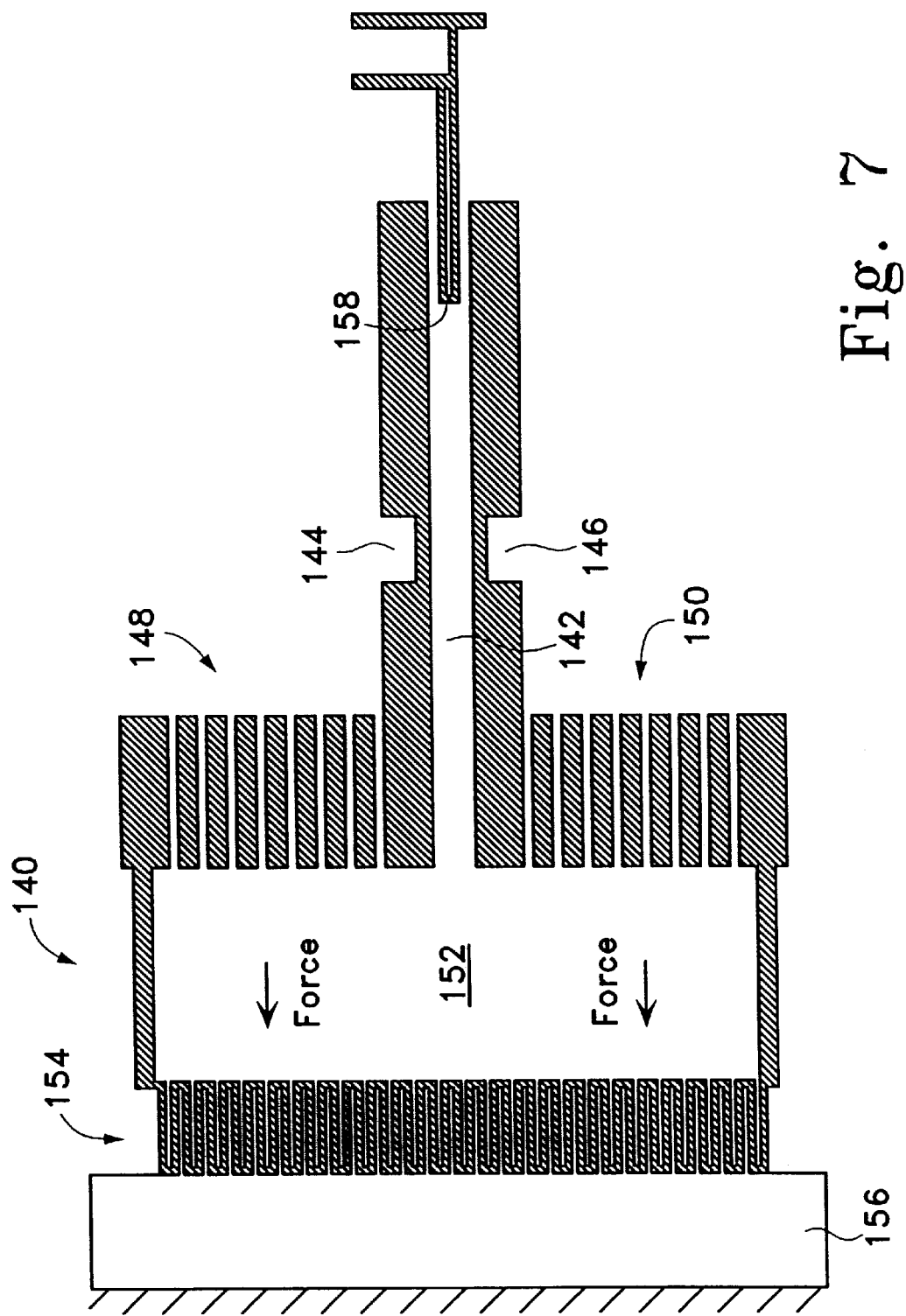
FIG. 7 is a top elevation view of a variable frequency, high-Q resonator in accordance with an embodiment of the invention.

Referring to the illustrative drawings of FIG. 7, there is shown a top elevation view of a variable frequency, high-Q single crystal silicon resonator. The dark regions represent deep channels or trenches formed through the deep reactive ion etch process described below. The resonator 140 includes a resonant beam 142 disposed between a pair of electrostatic deflection electrodes 144 and 146. A plurality of beams arrayed on either side of the beam 146 serve as thermal actuators 148 and 150. An enlarged head portion 152 has a plurality of plate elements which are interdigitated with complementary plate elements of a fixed structure 156. A piezoresistive element is formed in the most high stress region of the resonator 140 near its base that interconnects with the single crystal silicon first layer.

In operation, the electrostatic deflection electrodes 144 and 146 apply an AC voltage between them which excites the beam 142 to resonate. The frequency of resonation of the beam 142 can be detected using the peizoresistive sense element 158. The resonant frequency of the beam can be altered by changing the stiffness of the beam. The array of thermal actuators 148 and 150 can be used to selectively tune the resonant frequency of the beam.

Specifically, by differential heating of the thermal actuators 148 and 150, a coarse stiffening of the beam 142 can be achieved. This coarse stiffening of the beam 142 achieves a coarse tuning of its resonator. The thermal actuator achieves stiffening of the beam by pressing against the head plate 152. This pressing against the head plate stiffens the beam. The array of interdigitated plates electrostatic force plates 154 are used to achieve fine tuning of the resonant frequency of the beam. The amount of electrostatic force applied by using the array of plates 154 can be controlled with relative precision. Hence, the thermal actuators 148 and 150 are used for coarse tuning, and the electrostatic force plates are used for fine tuning. In this manner, a relatively high-Q resonator can be achieved. A high-Q resonator is one with an accurate and narrow frequency band.

The process for fabricating a silicon microsensor in accordance with a presently preferred embodiment of the invention is explained with reference to FIGS. 8A–G. The current embodiment employs two silicon wafers. The process results in the formation of a prescribed SCS microstructure as an integral portion of a first wafer. A second wafer serves as a carrier for the first wafer as explained below. Alternatively, the carrier can be formed of glass (pyrex), for example. It will be understood, of course, that although the following discussion refers to only two wafers, the principles can be applied to the formation of a microsensor comprising a stack of more than two wafers.

Figure 8A:
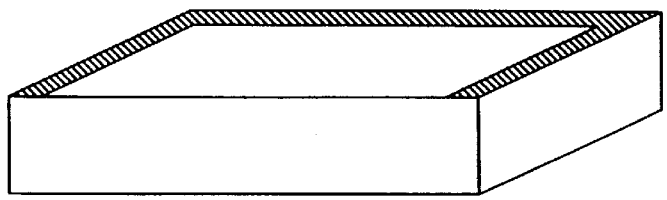
FIGS. 8A–8G illustrate fabrication process flow in accordance with the invention.
Figure 8B:
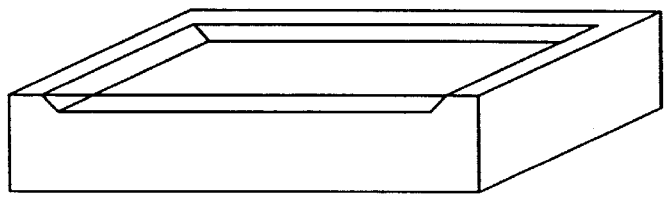

In FIG. 8A, the second wafer is patterned with a photoresist which defines a recessed region to be formed in the second wafer. In FIG. 8B, the recessed region is formed in the second wafer using standard semiconductor techniques such as, for example, plasma etching, wet-etching with KOH or other silicon etchants, or differential oxide growth. The recessed region can have any arbitrary geometry and can have any required depth, from <0.1 micron to >100 microns, for example.

It should be appreciated that the recessed region need not have a single, uniform depth. For example, several standard silicon etch steps may be employed to produce several different depths that can be used for different mechanical functions. Moreover, the second wafer surface can be either bare silicon or it can be coated with an oxide layer. Also, the base of the recessed region can be either bare silicon, oxidized silicon, doped silicon, or it can be coated with any other thin film capable of withstanding subsequent wafer bonding and processing temperatures.

Figure 8C:
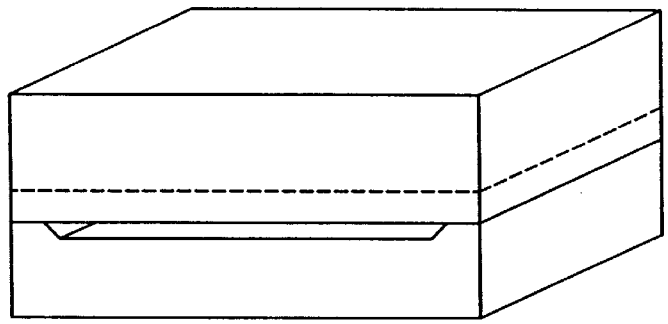

In FIG. 8C, the patterned surface of the second wafer is bonded to the first wafer by silicon fusion bonding (or direct bonding) process. Fusion bonding techniques are well known. For example, refer to, K. E. Petersen, D. Gee, F. Pourahmadi, R. Craddock, J. Brown, and L. Christel, "Surface Micromachined Structures Fabricated with Silicon Fusion Bonding," *Proceedings, Transducers* 91, June 1991, at pp. 397–399 which is expressly incorporated herein by this reference. In a currently preferred fusion bonding technique, the first and second wafers are made hydrophilic. That is, they are treated with an agent such as hot nitric acid or a hot sulfuric acid and hydrogen peroxide solution or another strong oxidant, that causes water to adhere to them. The two wafers then are placed in an oxidizing atmosphere at a temperature of 400° C.–1200° C. for approximately one hour.

The silicon fusion bonding technique described above bonds the first and second wafers together without the use of an intermediate glue material that could have a different coefficient of thermal expansion than the single crystal silicon wafers. Furthermore, fusion bonding can be performed in which oxide or nitride layers have been formed in the bonded surfaces of one or both of the wafers.

As an alternative to fusion bonding, for example, the first and second wafers can be adhered together with an adhesive such as a photoresist. As another alternative, the first and second wafers can have their major surfaces coated with a metal layer used to alloy the wafers to one another. In the event that a glass carrier is used instead of the second silicon wafer, the first wafer can be anodically bonded to such glass carrier.

Figure 8D:
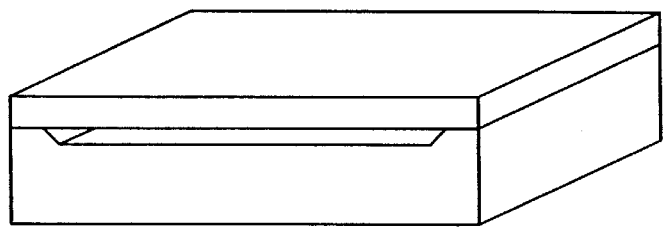
Figure 8E:
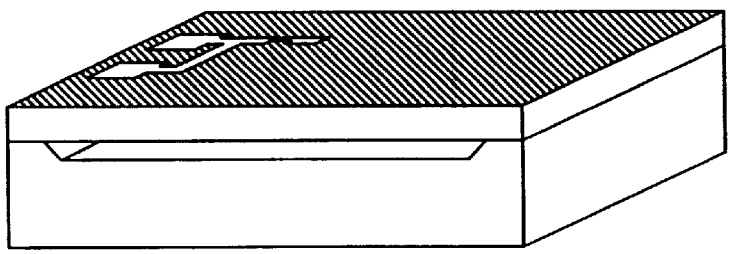

In FIG. 8D, the first wafer is thinned and polished to the thickness required by the particular application. Alternatively, electrochemical etching can be used to thin the wafer. In FIG. 20E, any necessary circuits or other thin film depositions and patterning can be performed using standard silicon processing techniques. Since the fusion bond is typically annealed at high temperature (>900° C.), there are few, if any, limitations imposed on the circuit processing temperatures to avoid harming the bond. Moreover, since the subsequent etch process discussed below is a dry etch, on-chip circuits can be protected with a deposited oxide layer or a silicon nitride layer of about 1.5 microns thickness or by photoresist.

Figure 8F:
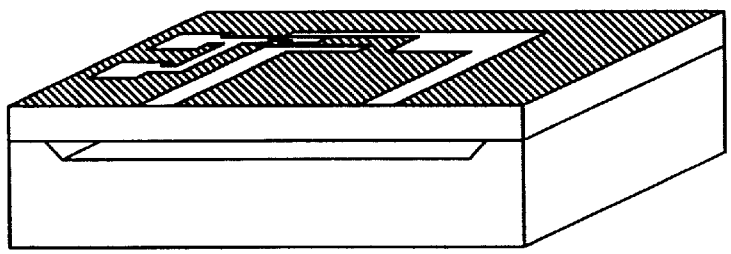

In FIG. 8F, the first wafer is patterned for a Deep Reactive Ion Etching (DRIE) step which defines the regions of the "top" wafer to be etched. DRIE techniques have become increasingly well known. For example, refer to: V. A. Yunkin, D. Fischer, and E. Voges, "Highly Anisotrophic Selective Reactive Ion Etching of Deep Trenches in Silicon," *Microelectronic Engineering*, Vol. 23, 1994, at 373–376; C. Linder, T. Tschan, N. F. de Rooij, "Deep Dry Etching Techniques as a New IC Compatible Tool for Silicon Micromachining," *Proceedings, Transducers '91*, June 1991, at 524–527; C. D. Fung and J. R. Linkowski, "Deep Etching of Silicon Using Plasma," *Proceedings of the Workshop on Micromachining and Micropackaging of Transducers*, Nov. 7–8, 1984, at 159–164; and J. W. Bartha, J. Greeschner, M. Puech, and P, Maquin, "Low Temperature Etching of Si in High Density Plasma Using $SF_6/O_2$," *Microelectronic Engineering*, Vol. 27, 1995, at 453–456. Reactive Ion etch equipment now allows the etching of holes or trenches which are very deep (>100 microns), while maintaining high aspect ratios (the ratio between the depth of the etched region and the width of the etched region). It has been found that this equipment is capable of at least 20:1 aspect ratios for trenches as deep as 300 microns.

DRIE, in essence, involves a synergistic action between chemical etch and ion bombardment. Impinging energized ions chemically react with the silicon surface. The DRIE process advantageously etches in the vertical direction at a much higher rate than in the lateral direction (e.g., anisotropically) regardless of silicon crystal planes or crystal orientation. As a result, relatively deep substantially vertical trenches or slots can be formed in the SCS first wafer. These substantially vertical trenches or slots can be formed anywhere in the first wafer regardless of crystallographic orientation within the wafer. Consequently, high aspect ratio structures such as capacitive or electrostatic plates can be formed, and arbitrarily contoured structures such as circles, ellipses and spirals can be formed.

Figure 8G:
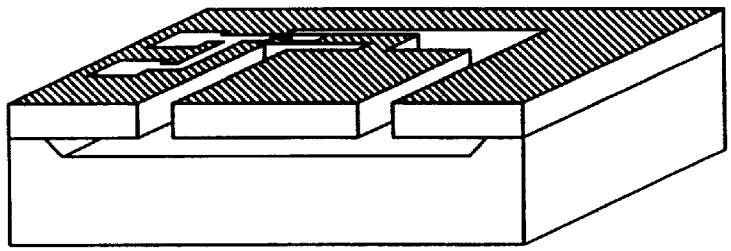

In FIG. 8G, a DRIE process is used to etch completely through the first wafer. The DRWE etching step mechanically "releases" the SCS microstructures formed in the first wafer, which are then free to move relative to the second wafer. Suspended plate/beam structures with aspect ratios (height/width) of up to 20:1 have been fabricated using the DRIE processes described below.

In one presently preferred approach to DRIE etching, high density plasma provides the basis for the high silicon etch-rate (5 $\mu$m/min.). The etching chemical is $SF_6$ at 2.5 pascals of pressure. A layer of $SiO_2$ or a Low Temperature Oxide mask serves as the patterning mask described in connection with FIG. 8F. A cryogenically cooled chuck, holding the wafer at approximately −100° C., causes the condensation of a very thin protective layer on the side walls of etched grooves. This masks the sidewalls, resulting in high aspect ratios (>15:1) even for very deep grooves. Oxygen additive gas plus $CHF_3$ additive gas help provide high $Si/SiO_2$ etch-rate ratios (>300:1) so simple 1 µm thick thermal oxide can be used as a mask for grooves etched at least as deep as 300 µm. The "micromachining etch tool" available from Alcatel which has a place of business in San Jose, Calif. can be employed to perform the Cryogenic DRIE.

In an alternative DRIE process, an inductively coupled plasma source etches the silicon using photoresist as a mask. Polymerization of the photoresist mask on the sidewalls of the etched trenches slows the lateral etch rate and allows high anisotropy. The etching chemical is $SF_6$ at 50 millitorrs. Oxygen additive gas and fluorinated gas available from Surface Technology Systems help provide high Si/photoresist etch-rate ratios. A six micron photoresist serves as the patterning mask discussed in reference to FIG. 8F. The photoresist selectivity is approximately 50:1, which makes it possible to etch to depths of 300 µm with about 6 µm of resist. The "multiplex RIE system", available from Surface Technology Systems (STS) which has a place of business in Palo Alto, Calif. can be employed to perform inductively coupled plasma DRIE.

Referring to the exemplary drawings of FIGS. 9A–9D, there are shown side cross-sectional views illustrating fabrication process flow during production of an encapsulated suspended structure and an encapsulated released structure in accordance with the invention. It will be understood that many details of the process steps described with reference to FIGS. 8A–8G are used during the fabrication steps described with respect to FIGS. 9A–9D. These process details will not be reiterated with reference to FIGS. 9A–9D, although they may be employed.

The encapsulation of the high aspect ratio structures in accordance with the present invention advantageously isolates the structures from many environmental effects such as humidity, for example. This isolation can be important since changes in humidity, for instance, can alter the resonant frequency of resonant structures. Moreover, the enclosure of such a structure affords the opportunity to fill the cavity in which the structure resides with a viscous fluid such as air or nitrogen which can dampen oscillations and thereby influence the resonant frequency. Conversely, the cavity can be set to a vacuum pressure in order to reduce damping. Note that single crystal silicon is a highly advantageous material for use in resonant devices because its low internal stresses and crystalline structure means that there is relatively little internal damping. As another alternative, for example, the cavity can be pressurized at an elevated pressure using helium or argon for effective cooling of the structure in case it is being heated. Thus, in addition to adjusting the resonant frequency, the damping ratio of a vibrating element and thermal conductivity within an enclosed cavity, can be altered as well.

Figure 9A:
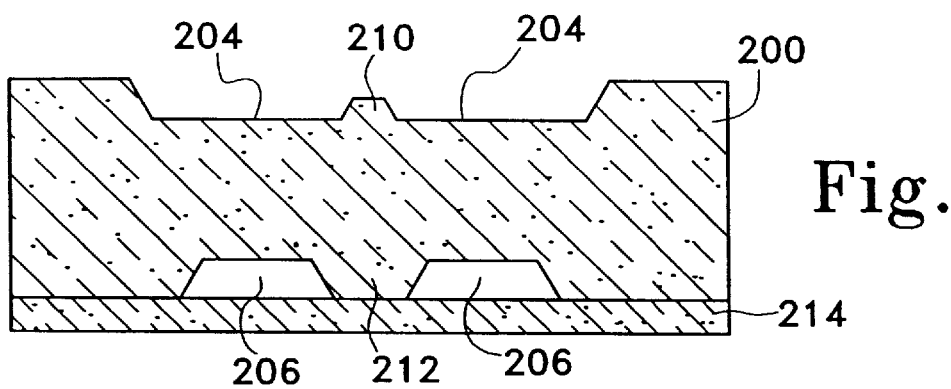
FIGS. 9A–9D are side cross-section views of a device in fabrication illustrating fabrication process flow during production of a suspended or a released structure in accordance with the invention.

In FIG. 9A, upper recess 204 is etched in an single crystal silicon (SCS) middle wafer 200, and lower recess 206 is etched in the same SCS wafer 200. In a current embodiment, the upper and lower recesses 204 and 206 are circular. An upper structure 210 upstands within the upper recess 204. A lower structure 212 upstands within the lower recess 206. Next, a lower wafer 214 is bonded to the SCS middle wafer 200 so as to enclose the lower recess 206. The lower wafer 214 is bonded to the upstanding or distal end of the lower upstanding structure 212 within the lower recess 206. The lower wafer 214, for example, can be single crystal silicon. However, as explained above with respect to FIGS. 8A–8G, other materials such as glass (pyrex) may be employed for the lower wafer 214. The lower wafer 214 may be grinded or polished to a desired thickness.

Figure 9B:
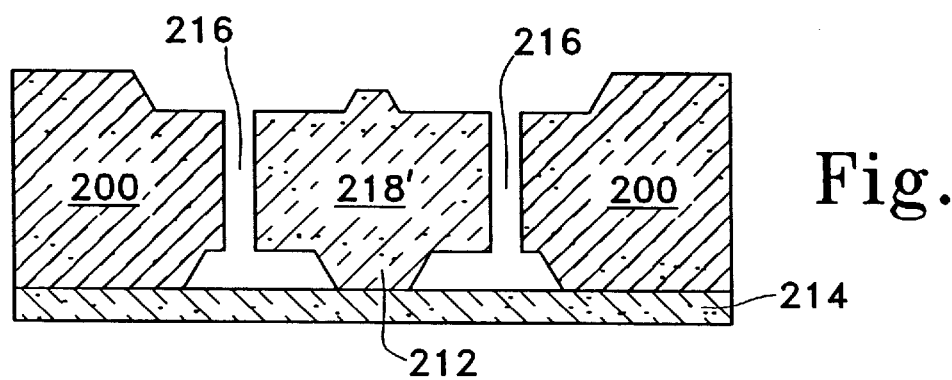

In FIG. 9B, a deep reactive ion etch (DRIE) process is employed to produce a high aspect ratio channel 216 which results in a suspended structure 218 surrounded by such high aspect ratio channel 216. The suspended structure 218 is suspended from the lower upstanding structure 212 which is attached to the lower wafer 214. The lower upstanding structure, therefore, anchors a lower end of the suspended structure 218 to the lower wafer 214. The channel 216, for example, can be circular which results in the formation of a generally cylindrical suspended structure 218. It will be appreciated, however, that a circular channel is just one of many possible channel shapes as explained below. Next, an upper wafer 220 is bonded to the wafer 200 enclosing the suspended structure 218 between the upper and lower wafers 220 and 214. The upper upstanding structure 210 has been etched so that its upper or distal end is below the upper surface of the middle wafer 200. As a result, when the upper wafer 220 is bonded to the middle wafer 200, there is a gap between the upper upstanding structure 210 and the upper wafer 220. An upper or distal end of the suspended structure 218, is not unattached to the upper wafer 220 and is free to move about. The suspended structure 218 si disposed within a cavity defined by the etched recesses 204 and 206 and by the DRI etched channel 216. The lower upstanding structure 212 anchors the suspended structure 218 to the lower wafer 214 within the cavity. As illustrated in FIGS. 1, 3, 6, 12A–12B and 13, the lower upstanding structure 212 can be constructed to be a flexible member, such as a spring or a beam, for sensor or actuator applications. Also, the suspended structure 218 may be encapsulated in an environment, gaseous or near vacuum, in which the bonding of the upper wafer 220 may take place.

Figure 9C:
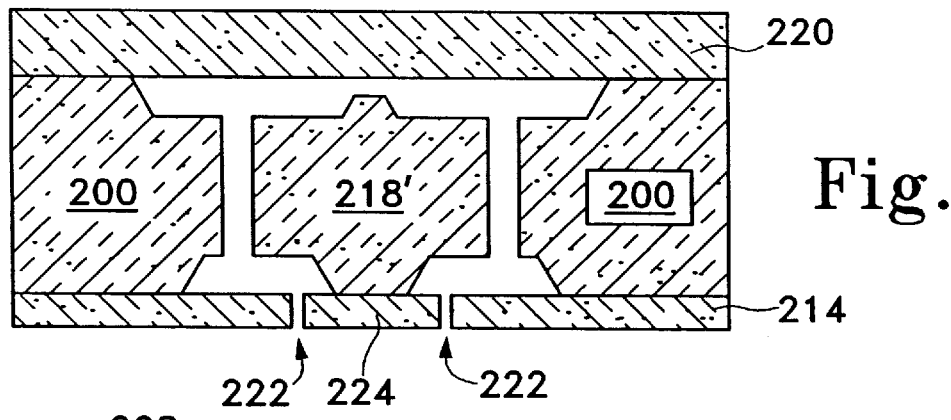
Figure 9D:
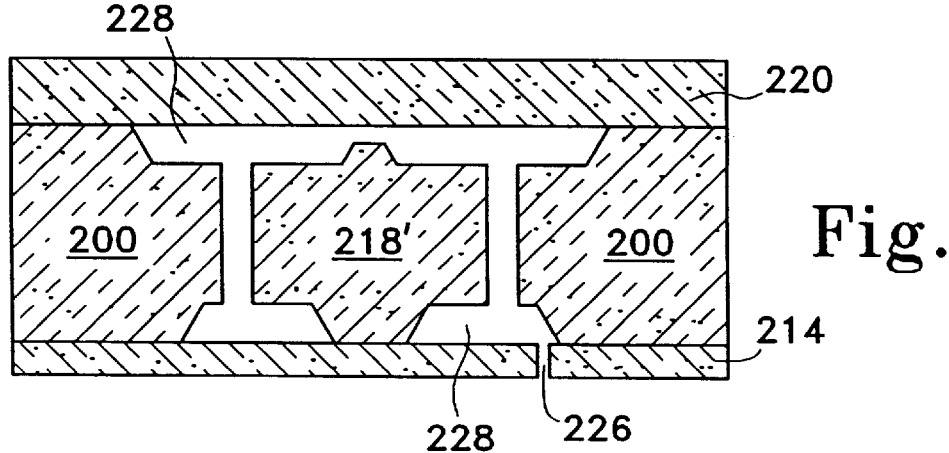

FIGS. 9C and 9D illustrate alternative etches that may be performed at this stage of the fabrication process. In FIG. 9C, an etch 222 through the lower wafer 214 can be performed to free the suspended structure 218 and thereby produce a released structure 218' which includes the former suspended structure plus a released portion 224 of the lower wafer 214. The channel 222 can be circular, for example, or can be made in other varied and complex shapes consistent with the invention. Also, note that the released wafer portion 224 is an integral part of the released structure 218' of FIG. 9C. In FIG. 9D, a hole 226 is etched in the lower wafer 220. The hole 226, for example, can be used to introduce a gas into the cavity 228 surrounding the suspended structure 218 and/or to pressurize the cavity 228. A fluid in the cavity 228, for example, might be used to dampen the vibration of the suspended structure 218. After the introduction of the gas or fluid or after the pressurization is complete, the hole may be sealed using and adhesive or an epoxy sealant for example.

Figure 10:
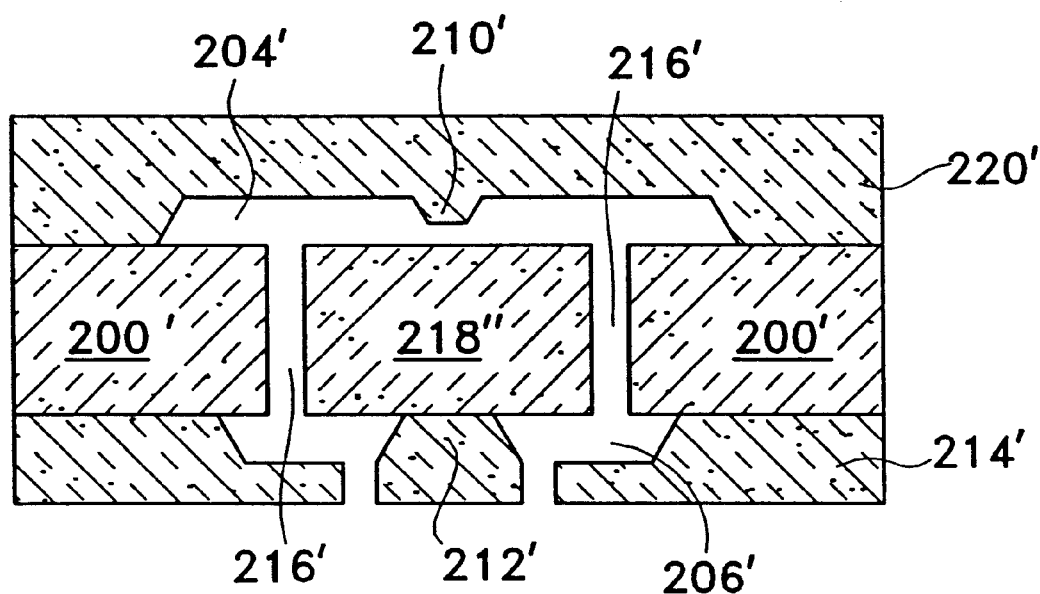
FIG. 10 is a side cross-section view of a device in fabrication showing a first alternative fabrication process flow during production of a released structure in accordance with the invention.

As an alternative to the overall fabrication process described above with respect to FIGS. 9A–9D, instead of forming recesses in a middle wafer, recesses could be formed in upper and lower (outer) wafers. For example, referring to the illustrative drawings of FIG. 10, there is shown a side crosssectional view of an alternative multiple wafer device with an SCS released structure 218". Upper and lower wafers 220' and 214' have recesses formed in them as shown. The recess in the upper wafer 220' defines an upper upstanding structure 210'. The recess 206' in the lower wafer 214' defines a lower upstanding structure 212'. A middle wafer 200' that has a channel 216' formed by a deep reactive ion etch is bonded between the upper and lower wafers 214' and 220'. Thus, the released structure 218' is disposed within a cavity defined by the etched recesses 204' and 206' and by the DRI etch channel 216'. The actual process step,s in, accordance with the invention, that produce the structure of FIG. 10 will be appreciated by those of ordinary skill in the art from the explanation above relative to FIGS. 9A–9D and need not be set forth in detail herein.

Figure 11:
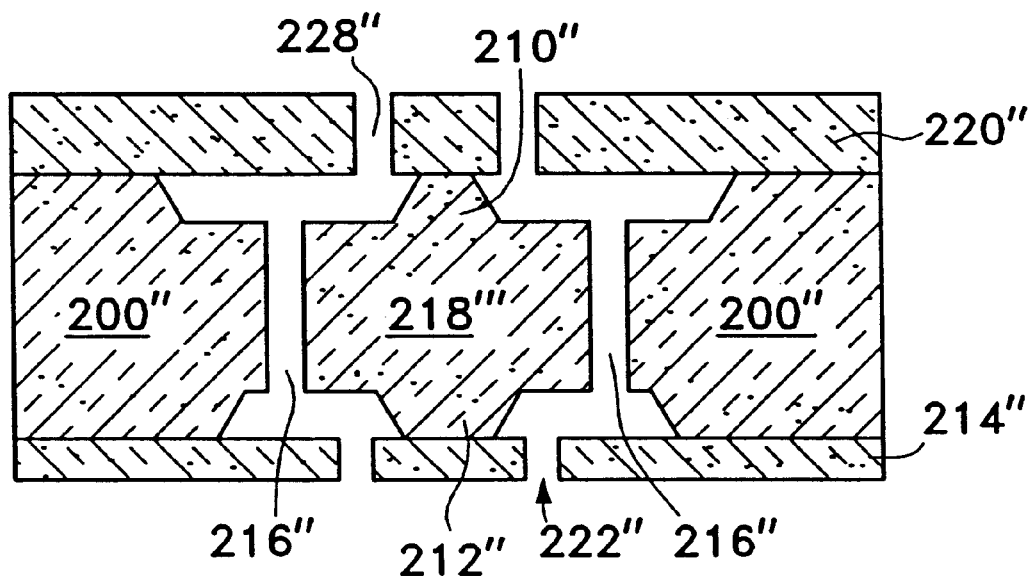
FIG. 11 is a side cross-section view of a device in fabrication showing a second alternative fabrication process flow during production of a released structure in accordance with the invention.

Another alternative to the overall fabrication process described above involves the etching through both upper and lower wafers in order to release a structure formed from a middle wafer. Referring to the illustrative drawing of FIG. 11, for example, there is shown a side cross-sectional view of another alternative multiple wafer device with an SCS released structure 218'''. The middle wafer 200" is etched in a manner similar to the wafer 200 of FIGS. 9A–9D. In particular, a channel 216" is formed by deep reactive ion etching. However, an upper upstanding structure 210" of the wafer 200" of FIG. 11 is bonded to an upper wafer 220". Hence, in order to release the structure 218''', a channel 222' is etched in a lower wafer 214", and a channel 228" is etched in the upper wafer 220". The actual process steps in, accordance with the invention, that produce the structure of FIG. 11 will be appreciated by those of ordinary skill in the art from the explanation above relative to FIGS. 9A–9D and need not be set forth in detail herein.

The released and suspended structures produced according to the fabrication processes described above can be quite complex. For example, although the exemplary structure in FIGS. 8A–8G, 9A–9D have generally cylindrical contours, more complex structures such as a gear could be produced. Such a gear, for example could be formed with high aspect ratio gear teeth and could be encapsulated within a pressurized or fluid filled chamber. Moreover, for example, the suspended structures of FIGS. 1, 3 and 5, the acceleration sensor of FIG. 6, the resonator of FIG. 7 or the resonators of FIGS. 12A–12B or of FIG. 13 can be produced by the above processes.

Figure 12A:
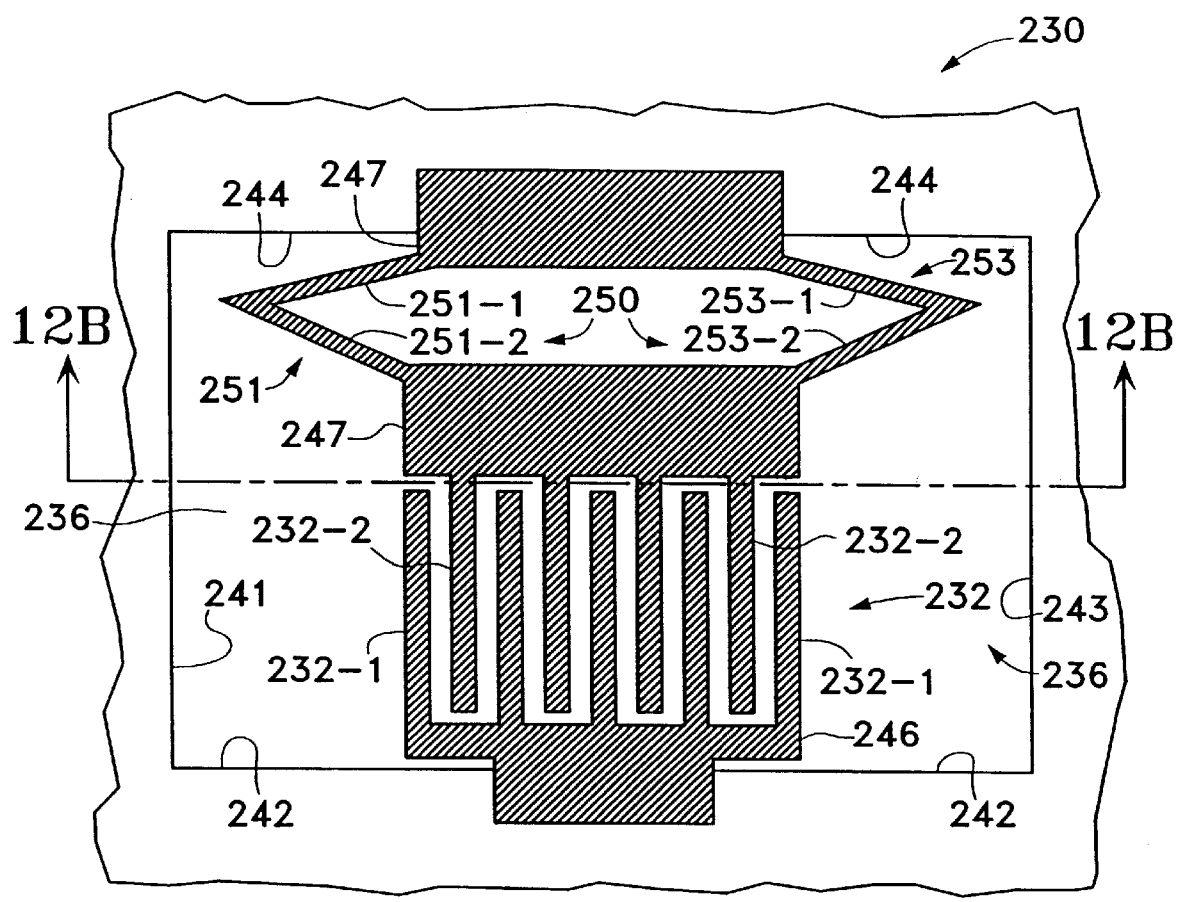
FIGS. 12A–12B are a top elevation and side cross-section views of a suspended resonator structure in accordance with the invention.
Figure 12B:
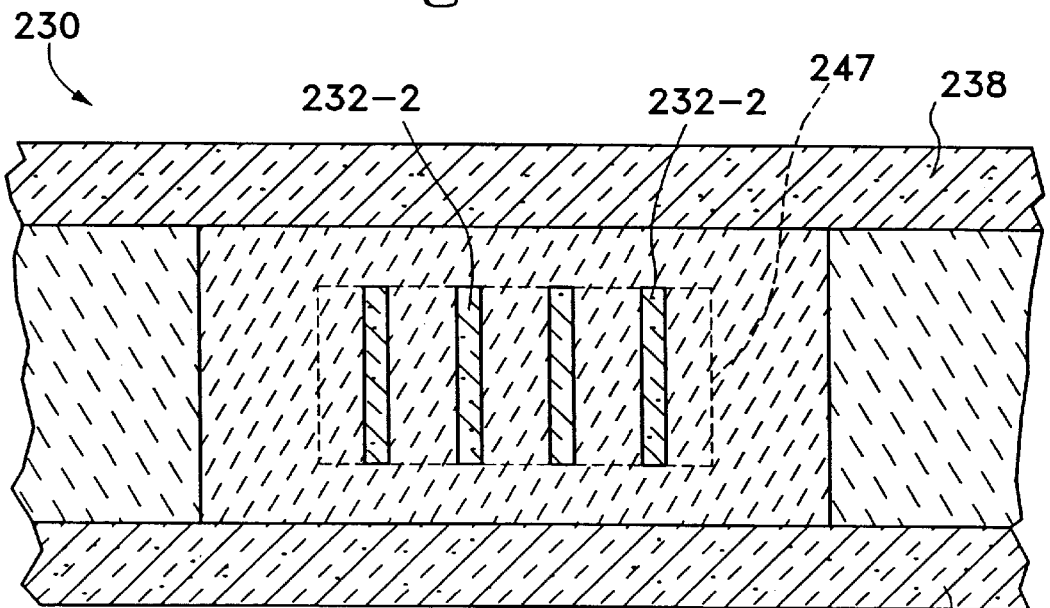

Referring to the illustrative drawings of FIGS. 12A–12B, there are shown a top cross-sectional view and a side cross-sectional view of an alternative embodiment of a high aspect ratio encapsulated SCS resonator 230 in accordance with the invention. The resonator 230 is enclosed within a chamber or cavity 236 bounded by substantially vertical walls 241–244 formed in a middle SCS wafer 234 which is disposed between an upper wafer 238 and a lower wafer 240. The resonator 230 includes an array of interleaved high aspect ratio plates 232-1 and 232-2. The illustrative drawing of FIG. 12B shows a side cross-sectional view of the SCS resonator 230 along line 12B—12B of FIG. 12A. Referring to FIG. 12B, the plates 232-1 and 232-2 are suspended from the middle SCS wafer 234 within the chamber 236 between a top wafer 238 and a bottom wafer 240. More particularly, a first set of plates 232-1 is suspended from a first support member 246 integral anchored to a wall 242 of the middle wafer 234 within the chamber 236, and a second set of plates 232-2 is suspended from a second support member 247 anchored to a wall 244 of the middle wafer 234 within the chamber 236. The first and second walls 242 and 244 are disposed opposite and facing each other within the cavity 236.

Specifically, the first set of plates 232-1 depend from a first support member 246 that is anchored to the first wall 242. Alternatively, the first set of plates could be suspended directly from the first wall 242. The second set of plates 232-2 depend from a second support element 248 which is suspended from a high aspect ratio spring structure 250. The spring structure, in turn, is suspended from the second wall 244 by a second support member 247. The spring structure 250 includes first and second angled members 251 and 253. Each respective angled member 251 and 253 includes a respective first segment 251-1 and 253-1. Each respective angled member 251 and 253 also includes respective second segments 251-2 and 253-2. A respective first end of each first segment 251-1 and 253-1 is integrally secured to the second support member 247. A respective first end of each second segment 251-2 and 253-2 is integrally secured to third support member 248. Respective second ends of the first and second segments 251-1 and 251-2 of the first angled member 251 are integrally joined together at an acute angle. Likewise, respective second ends of the first and second segments 253-1 and 253-2 of the second angled member 253 are integrally joined together at an acute angle.

Figure 13:
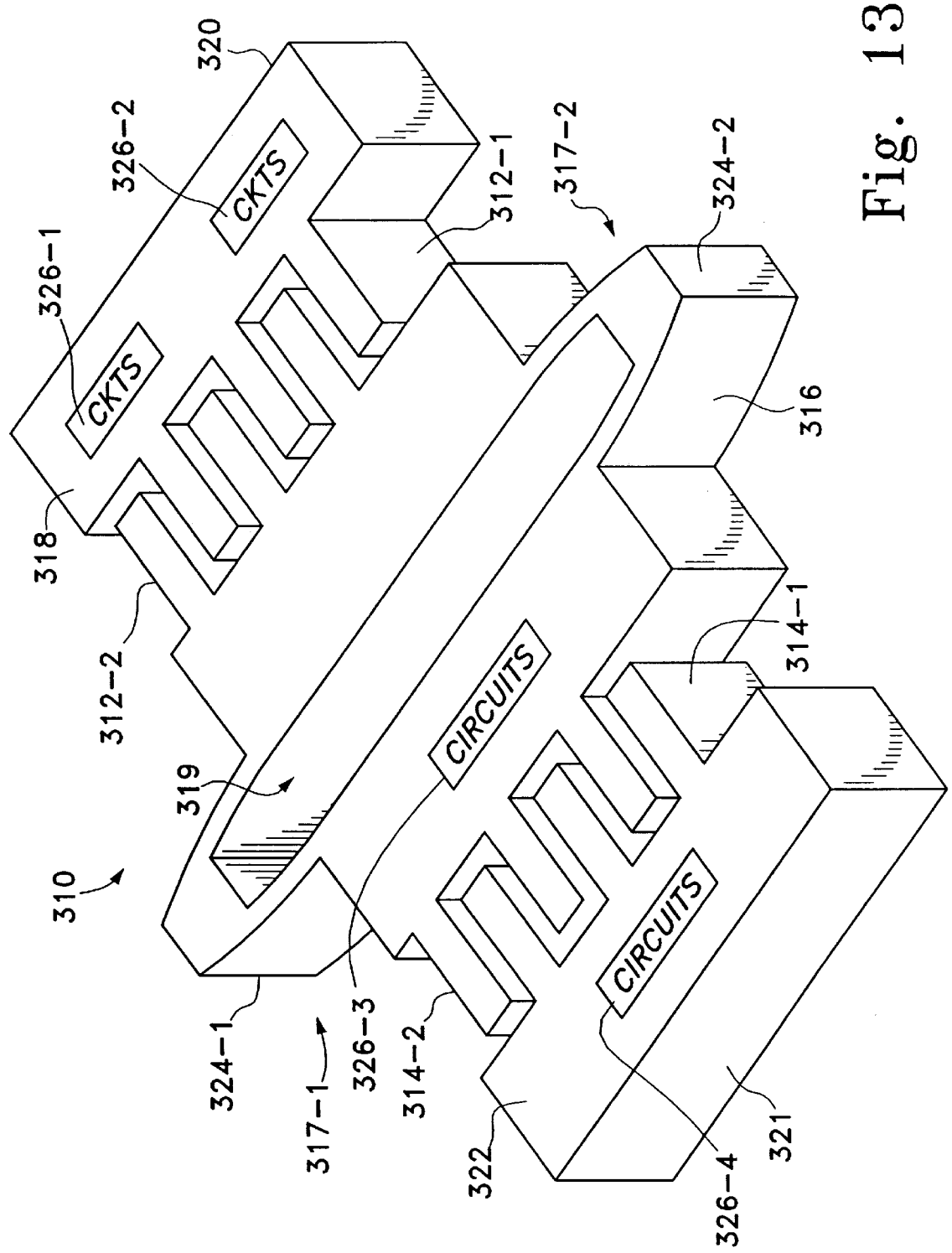
FIG. 13 is a top elevation view of an alternative suspended resonator structure in accordance with the invention.

The illustrative drawing of FIG. 13 shows a perspective view of another alternative suspended SCS resonator 310 in accordance with the invention. It will be appreciated that the suspended structure of FIG. 13, is formed in a middle wafer sandwiched between an upper and a lower wafer and is disposed within a cavity. Although neither the middle, upper nor lower wafers nor the cavity are shown. The resonator 310 includes a first set of interleaved high aspect ratio plates 312-1 and 312-2. The resonator 310 includes a second set of interleaved high aspect ratio plates 314-1 and 314-2. The resonator also includes a spring structure 316 which includes elongated segments 317-1 and 317-2 which define a space or gap 319 between them. Plates 312-1 depend from a first support member 318 anchored to a middle wafer (not shown) at side 320. Plates 312-2 depend from a first side of the spring 316. Plates 314-1 depend second support member 322 anchored to a middle wafer (not shown) at side 321. Plates 314-2 depend from a second side of the spring 316. The spring 316 is anchored within the cavity (not shown) at its distal ends 324-1 and 324-2. Integrated circuits 326-1, 326-2, 326-3 and 326-4 can be formed on the surfaces of the suspended resonator 310 as indicated.

An advantage of producing integrated circuits directly upon mechanical parts, such as a spring or interleaved plates, is improved parameter testing. For example, a diode or bipolar transistor formed on a mechanical part can be used to sense temperature which may influence mechanical behavior of the part. Another advantage is area savings since both the moving part and the integrated circuit are formed in the same portion of the device. Still another advantage is reduction or avoidance of parasitics. For instance, when circuit elements are distanced from mechanical structures, there is an increased risk of losses due to parasitics due to high frequency inductance effects or capacitance effects.

The resonators of FIGS. 12A–12B and FIG. 13 can be produced using processes illustrated in FIGS. 8A–8G and in FIGS. 9A–9D. For example, recesses can be etched in the top and bottom of a middle wafer. The recessed region can be etched using DRIE process can be employed to produce the high aspect ratio interleaved plates and high aspect ratio spring structures. Integrated circuits can be fabricated on the suspended structure using conventional semiconductor fabrication techniques.

The operation of the resonators 230 and 310 depends upon their implementation and purpose. For example, the resonator 230 or 310 can be implemented so that the spring member 250 or 316 flexes in response to electrostatic forces between the plates. The flexure of the spring can be sensed in order to provide a measure of the electrostatic forces. As yet another alternative, for example, the spring 250 or 316 can be fabricated to have a precise resonant frequency. The spring can be stimulated to vibrate at its resonant frequency. The capacitance between the plates also will vary at the resonant frequency of the spring. This capacitance change can be used to tune other electronic circuits (not shown) to the resonant frequency of the spring. Thus, there are numerous potential applications of the resonator of FIGS. 12A–12B and 13.

It will be appreciated that there are many possible variations to the SCS resonator of FIGS. 12A–12B and 13 consistent with the invention. For instance, the spring may be "U" shaped instead of "V" shaped. Alternatively, the spring may comprise a simple beam or multiple beams; or it may comprise a more complex beam(s) which has undulations "~" (a meandering path) along its length so as to define a meandering path. Furthermore, the number of plates may vary, and the amount of plate overlap may vary as well. In addition, the gap between plates may be uneven such that one side of a plate is closer to an adjacent plate than is the opposite side of such plate.

While specific embodiments of the invention have been described and illustrated, it will be appreciated that modification can be made to these embodiments without departing from the spirit of the invention. Thus, the invention is intended to be defined in terms of the following claims.

What is claimed is:

1. A semiconductor micromechanical device comprising:
   a first single crystal silicon wafer layer;
   a single crystal silicon structure formed in said first wafer layer and including two oppositely disposed substantially vertical major surfaces and including two oppositely disposed generally horizontal minor surfaces wherein the aspect ratio of major surface to minor surface is at least 5:1; and
   a carrier including a recessed region, wherein said carrier is secured to said first wafer layer such that said structure is suspended opposite the recessed region.

2. The micromechanical device of claim 1,
   wherein said carrier includes a silicon wafer layer; and
   wherein said first layer and said carrier are fusion bonded together.

3. The micromechanical device of claim 1 wherein said first layer is formed of (100) oriented silicon crystal.

4. The micromechanical device of claim 1 wherein the aspect ratio of major surface to minor surface is at least 20:1.

5. The micromechanical device of claim 1 wherein said structure is a beam secured at only one end thereof to said first wafer layer.

6. The micromechanical device of claim 1 wherein said structure is a beam secured at one end thereof to said first wafer layer and including a seismic mass at the other end thereof.

7. The micromechanical device of claim 1 wherein said structure is a beam secured at one end thereof to said first wafer layer and including an electronic circuit formed in the other end thereof.

8. The micromechanical device of claim 1,
   wherein said first layer is formed of (100) oriented silicon crystal; and
   wherein said structure is a beam secured at one end thereof to said first wafer layer and including an electronic circuit formed in the other end thereof.

9. The micromechanical device of claim 1 wherein said structure is a beam secured at one end thereof to said first wafer layer and including a plurality of vertical plates formed in the other end thereof.

10. The micromechanical device of claim 1,
    wherein said structure is a beam secured at one end thereof to said first wafer layer and including a plurality of vertical plates formed in the other end thereof; and
    wherein said vertical plates have an aspect ratio of at least 10:1.

11. The micromechanical device of claim 1,
    wherein said structure is a beam secured at one end thereof to said first wafer layer and including a plurality of vertical plates formed in the other end thereof and further including an electronic circuit formed in the other end thereof.

12. The micromechanical device of claim 1,
    wherein said first layer is formed of <100> oriented silicon crystal; and
    wherein said structure is a beam secured at one end thereof to said first wafer layer and including a plurality of vertical plates formed in the other end thereof and further including an electronic circuit formed in the other end thereof.

13. The micromechanical device of claim 1,
    wherein said first layer is formed of (100) oriented silicon crystal;
    wherein said structure is a beam secured at one end thereof to said first wafer layer and including a plurality of vertical plates formed in the other end thereof and further including an electronic circuit formed in the other end thereof; and
    wherein said vertical plates have an aspect ratio of at least 10:1.

14. The micromechanical device of claim 1 wherein said structure is a beam secured at both ends thereof to said first wafer layer.

15. The micromechanical device of claim 1 wherein said structure is a plate secured at only one end thereof to said first wafer layer.

16. A semiconductor micromechanical device comprising:
    a first single crystal silicon wafer layer;
    a plurality of single crystal silicon plates formed in said first wafer layer and having an aspect ratio of at least 10:1; and
    a second single crystal wafer layer secured to said first wafer layer such that said plates are suspended over the second wafer layer.

17. The micromechanical device of claim 1 wherein,
    said second wafer layer defines a recessed region and said plates are suspended opposite the recessed region.

18. The micromechanical device of claim 16 wherein said first layer and said second layer are fusion bonded together.

19. The micromechanical device of claim 16 wherein said first layer is formed of (100) oriented silicon crystal.

20. The micromechanical device of claim 16 wherein each plate has a height of at least 10 microns.

21. A semiconductor micromechanical device comprising:
    a first single crystal silicon wafer layer;
    a plurality of single crystal silicon beams formed in said first wafer layer and having an aspect ratio of at least 10:1; and
    a second single crystal wafer layer secured to said first wafer layer such that said beams are suspended over the second wafer layer.

22. The micromechanical device of claim 21 wherein, said second wafer layer defines a recessed region and said beams are suspended opposite the recessed region.

23. The micromechanical device of claim 21 wherein said first layer and said second layer are fusion bonded together.

24. The micromechanical device of claim 21 wherein said first layer is formed of (100) oriented silicon crystal.

25. The micromechanical device of claim 21 wherein at least one of said plurality of beams includes a plurality of vertical plates formed therein.

26. The micromechanical device of claim 21,
wherein at least one of said plurality of beams includes a plurality of vertical plates formed therein; and
wherein said vertical plates have an aspect ratio of at least 10:1.

27. The micromechanical device of claim 21,
wherein at least one of said plurality of beams includes a plurality of vertical plates formed therein;
wherein said first wafer layer is formed of (100) oriented silicon crystal; and
wherein said vertical plates have an aspect ratio of at least 10:1.

28. The micromechanical device of claim 21,
wherein at least one of said plurality of beams includes an electronic circuit formed therein.

29. The micromechanical device of claim 21,
wherein at least one of said plurality of beams includes an electronic circuit formed therein; and
wherein said first wafer layer is formed of (100) oriented silicon crystal.

30. The micromechanical device of claim 21,
wherein at least one of said plurality of beams includes an electronic circuit formed therein and further includes a plurality of vertical plates formed therein.

31. The micromechanical device of claim 21,
wherein at least one of said plurality of beams includes an electronic circuit formed therein and further includes a plurality of vertical plates formed therein; and
wherein said first wafer layer is formed of (100) oriented silicon crystal.

32. The micromechanical device of claim 21,
wherein at least one of said plurality of beams includes an electronic circuit formed therein and further includes a plurality of vertical plates formed therein; and
wherein said vertical plates have an aspect ratio of at least 10:1.

33. The micromechanical device of claim 21,
wherein at least one of said plurality of beams includes an electronic circuit formed therein and further includes a plurality of vertical plates formed therein;
wherein said first wafer layer is formed of (100) oriented silicon crystal; and
wherein said vertical plates have an aspect ratio of at least 10:1.

34. The micromechanical device of claim 21, wherein each beam has a height of at least 10 microns.

35. A semiconductor micromechanical device produced by the steps of:
providing a first single crystal silicon wafer layer;
providing a carrier including a recessed region;
bonding the first wafer layer to the carrier with the recessed region facing the first wafer layer; and
etching substantially vertically through the first wafer layer opposite the recessed region so as to form a beam integral with the first wafer layer and suspended over the recessed region wherein the beam has an aspect ratio of height to width of at least 5:1.

36. The micromechanical device of claim 35 wherein the step of etching includes reactive ion etching.

37. The transducer of claim 35 wherein the step of providing the first wafer layer includes providing a single crystal (100) oriented silicon wafer layer.

38. The micromechanical device of claim 35 wherein the step of etching includes etching substantially vertically through the first wafer layer opposite the recessed region so as to form multiple beams integral with the first wafer layer and suspended over the recessed region wherein each beam has an aspect ratio of height to width of at least 10:1.

39. A semiconductor micromechanical device produced by the steps of:
providing a first single crystal silicon wafer layer;
providing a carrier including a recessed region;
fusion bonding the first wafer layer to the carrier with the recessed region facing the first wafer layer; and
etching substantially vertically through the first wafer layer opposite the recessed region so as to form a plate integral with the first wafer layer and suspended over the recessed region wherein the plate has an aspect ratio of height to width of at least 5:1.

40. The micromechanical device of claim 39 wherein the step of etching includes reactive ion etching.

41. The micromechanical device of claim 39 wherein the step of providing the first wafer layer includes providing a single crystal (100) oriented silicon wafer layer.

42. The micromechanical device of claim 39 wherein the step of etching includes etching substantially vertically through the first wafer layer opposite the recessed region so as to form multiple plates integrated with the first wafer layer and suspended over the recessed region wherein each plate has an aspect ratio of height to width of at least 10:1.

43. The semiconductor micromechanical device of claim 1 wherein said recessed region has a generally planar surface.

44. The semiconductor micromechanical device of claim 1 wherein one of said minor surfaces facing said recessed region is generally planar.

45. The semiconductor micromechanical device of claim 16 wherein said second layer has a generally planar surface facing said suspended plates.

46. The semiconductor micromechanical device of claim 16 wherein said plates comprise generally planar surfaces facing said second wafer layer.

47. The semiconductor micromechanical device of claim 21 wherein said second wafer layer includes a generally planar surface facing said suspended beams.

48. The semiconductor micromechanical device of claim 21 wherein said beams comprise generally planar surfaces facing said second wafer layer.

49. The semiconductor micromechanical device of claim 35 wherein the step of providing a carrier includes providing a generally planar surface in said recessed region.

50. The semiconductor micromechanical device of claim 39 wherein the step of providing a carrier includes providing a generally planar surface in said recessed region.

51. A semiconductor micromechanical device comprising:
- a single crystal silicon substrate;
- a single crystal silicon structure formed in said substrate and including two oppositely disposed substantially vertical major surfaces and including two oppositely disposed generally horizontal minor surfaces wherein the aspect ratio of major surface to minor surface is at least 5:1; and
- a generally planar surface over which said structure is suspended.

52. The semiconductor micromechanical device of claim 51 wherein one of said horizontal minor surfaces of said structure facing the planar surface is generally planar.

53. The semiconductor micromechanical device of claim 51 further comprising a carrier, said carrier defines said generally planar surface over which said structure is suspended.

54. The semiconductor micromechanical device of claim 53 wherein said carrier includes a silicon wafer layer, said substrate and said carrier are fusion bonded together.

* * * * *

UNITED STATES PATENT AND TRADEMARK OFFICE
CERTIFICATE OF CORRECTION

PATENT NO. : 6,316,796 B1 Page 1 of 1
DATED : November 13, 2001
INVENTOR(S) : Petersen, Kurt E., Maluf, Nadim, McCulley, Wendell, Logan, John, Klaasen, Erno and Noworolski, Jan Mark It is certified that error appears in the above-identified patent and that said Letters Patent is hereby corrected as shown below:

<u>Title page, Item [54] and Column 1, lines 1-3,</u>
Please replace the title of the invention "SINGLE CRYSTAL SILICON SENSOR WITH HIGH ASPECT RATIO AND CURVILEANEAR STRUCTURES" with the following: -- SINGLE CRYSTAL SILICON SENSOR WITH HIGH ASPECT RATIO AND CURVILEANEAR STRUCTURES AND ASSOCIATED METHOD --.

<u>Column 16,</u>
Line 10, please replace the word "transducer" with the words -- micromechanical device --.

Signed and Sealed this

Thirteenth Day of August, 2002

Attest:

JAMES E. ROGAN
Attesting Officer
*Director of the United States Patent and Trademark Office*